(12) United States Patent
Asanovic et al.

(10) Patent No.: US 12,468,540 B2
(45) Date of Patent: Nov. 11, 2025

(54) TECHNOLOGIES FOR PREDICTION-BASED REGISTER RENAMING

(71) Applicant: SiFive, Inc., San Mateo, CA (US)

(72) Inventors: Krste Asanovic, Oakland, CA (US); Andrew Waterman, Berkeley, CA (US)

(73) Assignee: SiFive, Inc., Santa Clara, CA (US)

( * ) Notice: Subject to any disclaimer, the term of this patent is extended or adjusted under 35 U.S.C. 154(b) by 0 days.

(21) Appl. No.: 18/017,792

(22) PCT Filed: Jul. 23, 2021

(86) PCT No.: PCT/US2021/042904
§ 371 (c)(1),
(2) Date: Jan. 24, 2023

(87) PCT Pub. No.: WO2022/020681
PCT Pub. Date: Jan. 27, 2022

(65) Prior Publication Data
US 2023/0305852 A1   Sep. 28, 2023

Related U.S. Application Data

(60) Provisional application No. 63/056,542, filed on Jul. 24, 2020.

(51) Int. Cl.
*G06F 9/38* (2018.01)
*G06F 9/30* (2018.01)

(52) U.S. Cl.
CPC ............ *G06F 9/384* (2013.01); *G06F 9/3013* (2013.01)

(58) Field of Classification Search
CPC ...... G06F 9/384; G06F 9/3013; G06F 9/3828; G06F 9/3891; Y02D 10/00
See application file for complete search history.

(56) References Cited

U.S. PATENT DOCUMENTS

| 6,167,508 A | 12/2000 | Farrell et al. |
| 2007/0157008 A1* | 7/2007 | Sodani ............... G06F 9/3012 712/239 |

(Continued)

OTHER PUBLICATIONS

Tabani et al., "A Novel Register Renaming Technique for Out-of-Order Processors", 2018 IEEE International Symposium on High Performance Computer Architecture, pp. 259-270.*

(Continued)

*Primary Examiner* — David J. Huisman
(74) *Attorney, Agent, or Firm* — Kilpatrick Townsend & Stockton LLP (57) ABSTRACT

Systems and methods are disclosed for register renaming. For example, an integrated circuit is described that includes a first cluster including a first set of physical registers and a first execution resource circuit, wherein the inputs for operations of the first execution resource circuit are of a first data type; a second cluster including a second set of physical registers and a second execution resource circuit, wherein the inputs for operations of the second execution resource circuit are of a second data type that is different than the first data type; and a register renaming circuit configured to: determine a data type prediction for a result of a first instruction that will be mapped to a first logical register; and, based on the data type prediction matching the first data type, rename the first logical register to be mapped to a physical register of the first set of physical registers.

12 Claims, 7 Drawing Sheets

(56) References Cited

U.S. PATENT DOCUMENTS

2014/0282575 A1   9/2014   Chan
2019/0042540 A1   2/2019   Sade et al.

OTHER PUBLICATIONS

European Office Action for Application No. 21 756 105.9-1203, issued Apr. 9, 2024, 5 pages.
The Design Space of Register Renaming Techniques; Sep.-Oct. 2000; 14 pages.
The RISC-V Instruction Set Manual vol. I: Unprivileged ISA; Editors Andrew Waterman, Krste Asanovic; Jun. 8, 2019; 236 pages.
Tomasulo algorithm; Wikipedia; Accessed Apr. 17, 2020; 8 pages.
Register Renaming; By Sorin, Roth, Hill, Wood, Sohi, Vijaykumar, Lipasti; 2009; 13 pages.
The Alpha 21264 Microprocessor; 1999; 13 pages.
Great Microprocessors of the Past and Present (V 10.0.0) by John Bayko; Apr. 17, 2020, 52 pages.
A Highly Productive Implementation of an Out-of-Order Processor Generator by Christopher Celio; Dec. 1, 2018; 157 pages.
Extended European Search Report for Application No. EP25171628.8, Mailed On Jul. 10, 2025, 8 pages.

\* cited by examiner

TECHNOLOGIES FOR PREDICTION-BASED REGISTER RENAMING

CROSS-REFERENCE TO RELATED APPLICATION(S)

This application claims the benefit of U.S. Provisional Patent Application No. 63/056,542, filed on Jul. 24, 2020, which is incorporated herein by reference in its entirety.

TECHNICAL FIELD

This disclosure relates to register renaming for power conservation.

BACKGROUND

Modern processors often use out-of-order execution with physical register renaming Previous systems have used physical register renaming to remove write-after-write and write-after-read hazards by allocating a new destination register for each result produced.

In some processors (e.g., Motorola 88000 and RISC-V Zfinx option), an architectural register can hold different types of data at different times. For example, a single register can hold an integer value or a floating-point value. In some conventional processors, where the instruction set architecture allows multiple data types to be held in the same architectural register, a unified physical register file has been used to hold the different data types with routing to a variety of functional units processing the different data types.

In two-dimensional structures for matrix computations (e.g., systolic arrays) the operands are located in the array. The two-dimensional structures for matrix computations are hardwired and generally used in fixed function machines.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Overview

Disclosed herein are implementations of register renaming for power conservation.

In a first aspect, the subject matter described in this Specification can be embodied in integrated circuit for executing instructions that include a first cluster including a first set of physical registers and a first execution resource circuit configured to perform operations that take contents of one or more registers of the first set of physical registers as input, wherein the inputs for operations of the first execution resource circuit are of a first data type; a second cluster including a second set of physical registers and a second execution resource circuit configured to perform operations that take contents of one or more registers of the second set of physical registers as input, wherein the inputs for operations of the second execution resource circuit are of a second data type that is different than the first data type; and a register renaming circuit configured to: determine a data type prediction for a result of a first instruction that will be mapped to a first logical register; and, based on the data type prediction matching the first data type, rename the first logical register to be mapped to a physical register of the first set of physical registers.

In a second aspect, the subject matter described in this Specification can be embodied in methods that include determining a data type prediction for a result of a first instruction that will be mapped to a first logical register; and, based on the data type prediction matching a first data type, renaming the first logical register to be mapped to a physical register of a first luster chosen from among a plurality of clusters, wherein the plurality of clusters includes: a first cluster including a first set of physical registers and a first execution resource circuit configured to perform operations that take contents of one or more registers of the first set of physical registers as input, wherein the inputs for operations of the first execution resource circuit are of the first data type; and a second cluster including a second set of physical registers and a second execution resource circuit configured to perform operations that take contents of one or more registers of the second set of physical registers as input, wherein the inputs for operations of the second execution resource circuit are of a second data type that is different than the first data type.

In a third aspect, the subject matter described in this Specification can be embodied in integrated circuits for executing instructions that include an execution resource circuit configured to execute instructions on operands mapped to physical registers, a set of physical registers including a first subset of physical registers located in proximity to the execution resource circuit and a second subset of physical registers that are located further from the execution resource circuit than the registers in the first subset of physical registers, and a register renaming circuit configured to: detect a sequence of instructions mapped to an instruction decode buffer, the sequence of instructions including multiple sequential references to a first logical register with true dependency; and, based on detection of the sequence of instructions, rename the first logical register to be mapped to a physical register of the first subset of physical registers and rename another logical register referenced in the sequence of instructions to be mapped to a physical register of the second subset of physical registers.

These and other aspects of the present disclosure are disclosed in the following detailed description, the appended claims, and the accompanying figures.

Storage and processing of the different data types can be improved using specialized physical structures. For example, one such structure is a cluster comprising a combination of a physical register file and functional units closely coupled using local datapaths. One benefit of this approach is that the representation of data values in each register file can be optimized for the dynamic data type currently present in each architectural register. A second benefit may be that sequences of computations involving the same data types are localized to the same cluster, improving energy efficiency and reducing circuit delays.

Some implementations described herein may provide the benefits of providing separate localized processing of different data types in optimized clusters, even when the instruction set architecture requires that all data types are held and processed from a unified set of architectural registers. For example, a scalar processor with a unified architectural register file can provide two clusters, one for integer and one for floating-point data types. A method described here dynamically allocates values to clusters and performs computations in the appropriate cluster based on data type.

For example, some implementations determine which cluster to execute an instruction based on instruction opcode, allocate destination in that cluster if space is available and update map table (otherwise stall decode), check map table to see if sources are in correct cluster, and if so, dispatch instruction to cluster, and if sources are in wrong cluster (e.g., loaded into integer register file, but now processed as a float), insert additional micro-ops to move data from one cluster to another, potentially reformatting data as part of the conversion.

When the destination format is not clear from opcode (e.g., load from memory), a prediction can be made. For example, some options for prediction include: 1) same as last type for the same architectural register. The observation is that in many codes, especially loops, the same architectural registers are used to hold the same types repeatedly. Software can improve the performance of this scheme if the software is made aware of this prediction policy. 2) look ahead in an instruction buffer to see if a following opcode indicates the use of this source. 3) randomly generate a data type prediction. 4) based on program counter (PC) plus instruction encoding. Where encoding is sufficient to determine result type, ignore the program counter, otherwise use some portion of the program counter to index into prediction table. For example, the same architectural register could be used twice in the same loop to hold different types of data.

```
loop: lw x1, (x2)    # Load, used as float
      fadd.s x3, x3, x1
      addi x2, x2, 4
      lw x1, (x4)    # Load, used as integer
      addi x4, x4, 4
      bnez x1, loop
```

Combinations of the above may be used to determine a data type prediction for a result of an instruction that will be stored in a destination register.

For example, some extensions include: 1) Processors often provide operations on Boolean values. For example, a comparison instruction that may return either a 1 or 0. These are often used as inputs to a branch instruction or additional logic operations. A specialized cluster for predicate values can be provided to improve performance of these instructions. The physical storage for these single-bit values is much less than for full-width physical registers, and processing these values requires much less energy than for full-width physical registers. In the case of logical operations (e.g., AND, OR, XOR), the instruction encoding plus the source data types are used to determine which cluster to use. Branch execution is often on the critical path in a processor and isolating Booleans into a separate cluster can reduce circuit delay for branch resolution. 2) Half-width scalars (e.g., 32-bit width in 64-bit scalars) may be used to obtain more capacity by reusing physical registers. 3). A separate cluster for packed-SIMD values in scalar registers may provide so as to reduce critical path for non-packed-SIMD values. This may improve packed-SIMD cluster for energy with longer circuit delay. 4.) Vector Regfiles.

Systems and methods for register renaming are disclosed. An integrated circuit (e.g., a processor or microcontroller) may decode and execute instructions of an instruction set architecture (ISA) (e.g., a RISC V instruction set). This approach for integrated circuit design uses register renaming to get some of the benefits of a fixed function machine with two-dimensional structures for matrix computations (e.g., systolic arrays) within a general purpose CPU. For example, consider multiply and add matrices. If the source and destination are the same (c<-c*a+b) then the c matrix could stay "put" in the array and one of the others (e.g., a, and then b) is the only thing flowing in potentially.

Register renaming has been done previously with a different goal. Previously the goal was to remove false dependencies, such as write-after-read and write-after-write (WAR and WAW). Here though, we allocate a new physical register for each result that is writing. So contrast: rc2=rc1+ral*rbl. Now rc2 is in a different physical register instead of rc1. But what we want to do is have rc1 stay in place by overwriting it, e.g. rc1=rc1+ral*rbl.

Another difference is that renaming is performed based on the physical location in the chip (e.g., closeness to the arithmetic logic units (ALUs)). Prior techniques were usually using registers that were all in a central register file, but here renaming may be performed to force one of the inputs to the ALU to be physically proximate to the ALU, which may reduce the power required to transfer the value to the ALU for execution of a subsequent instruction. These power savings can be particularly significant for vector or matrix operations. For example, consider the instruction C=A+B, where A, B, and C are vectors. In this example, C may be re-allocated to a standard one-dimensional vector. For example, consider the instruction F=D+E, where D, E, and F are matrices. In this example, F would be a two-dimensional structure next to the ALUs. The shape/size of the allocated register may be changed based on the type of data and operation.

As used herein, the term "circuit" refers to an arrangement of electronic components (e.g., transistors, resistors, capacitors, and/or inductors) that is structured to implement one or more functions. For example, a circuit may include one or more transistors interconnected to form logic gates that collectively implement a logical function.

Details

Figure 1:
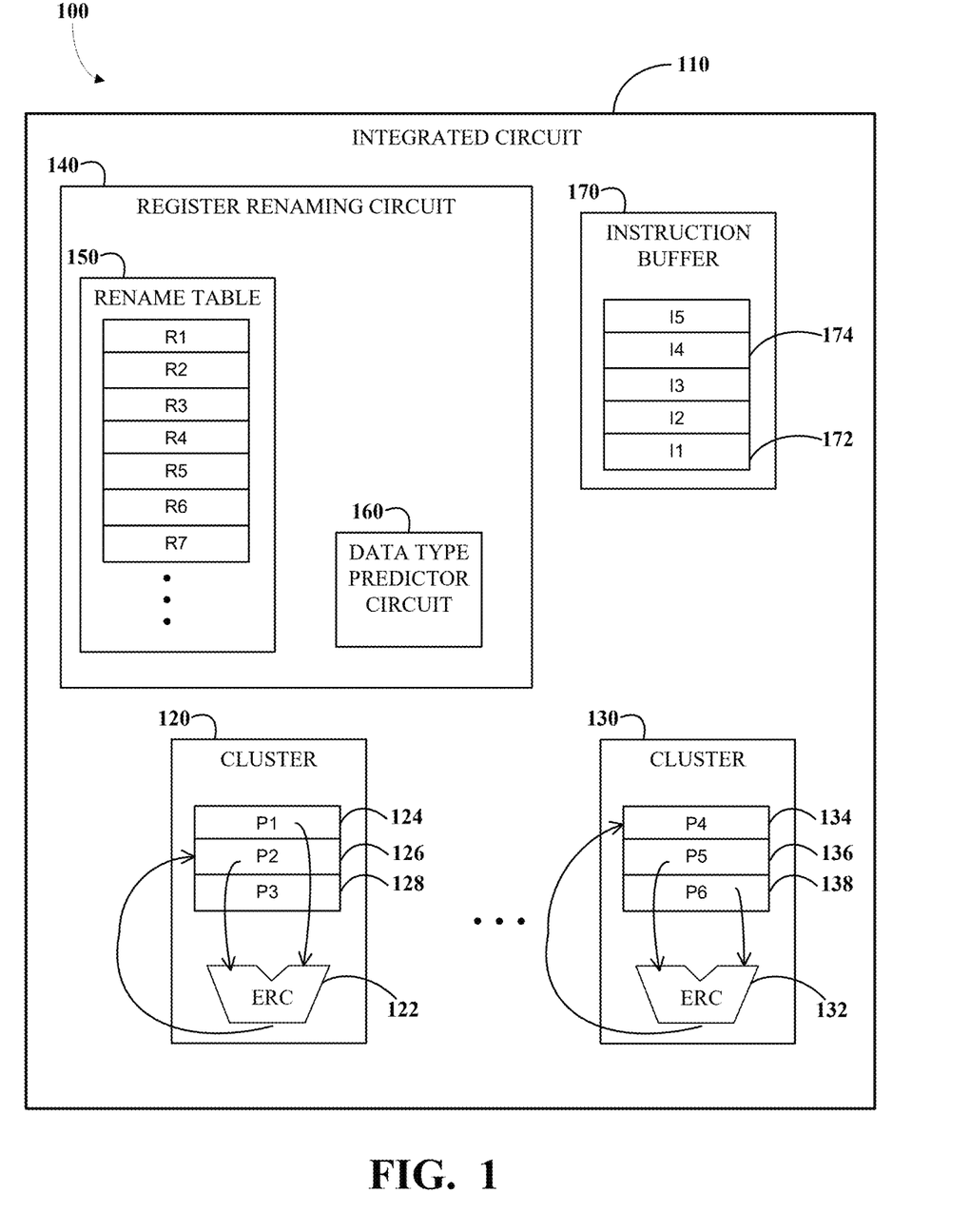
FIG. 1 is block diagram of an example of a system for executing instructions with register renaming based on data type prediction.

FIG. 1 is block diagram of an example of a system 100 for executing instructions with register renaming based on data type prediction. The system 100 includes an integrated circuit 110 for executing instructions (e.g., RISC-V instructions or x86 instructions). The integrated circuit 110 includes: a first cluster 120 configured to perform operations on one or more inputs of a first data type; a second cluster 130 configured to perform operations on one or more inputs of a second data type; and a register renaming circuit 140 configured to rename logical registers to map to physical registers in a cluster chosen from amongst a set of clusters based on a data type prediction for a result of an instruction (e.g., a load instruction, an add instruction, or an xor instruction). The integrated circuit 110 may include additional clusters (not shown in FIG. 1) that execute instructions taking inputs of additional different data types. In some implementations, the integrated circuit 110 may include additional clusters (not shown in FIG. 1) that execute instructions taking inputs of the first data type or the second data type and register renaming may be based on additional considerations, such as true dependency among a sequence of instructions, when selecting among multiple clusters using a same data type for register renaming. The integrated circuit 110 includes an instruction buffer 170 that stores instructions that are expected to be executed in the near future. For example, integrated circuit 110 may be microprocessor or a microcontroller.

The integrated circuit 110 includes a first cluster 120 including a first set of physical registers 124, 126, and 128 and a first execution resource circuit 122 configured to perform operations that take contents of one or more registers of the first set of physical registers 124, 126, and 128 as input. The inputs for operations of the first execution resource circuit 122 are of a first data type (e.g., integer, float, Boolean, scalar, vector, or matrix). For example, the execution resource circuit 122 may include an arithmetic logic unit (ALU). For example, the execution resource circuit 122 may include a floating point unit (FPU). The cluster may include datapaths that enable the execution resource circuit 122 to access the registers of the first set of physical registers 124, 126, and 128 as a source register holding an input argument and/or as a destination register to hold a result. For example, the first cluster 120 may be used to execute an instruction (e.g., an addition instruction) taking a value stored in the physical register 124 and a value stored in the physical register 126 as input arguments and output a result to the physical register 126. For example, the first set of physical registers 124, 126, and 128 may be in close proximity to the first execution resource circuit 122.

The integrated circuit 110 includes a second cluster 130 including a second set of physical registers 134, 136, and 138 and a second execution resource circuit 132 configured to perform operations that take contents of one or more registers of the second set of physical registers as input. The inputs for operations of the second execution resource circuit 132 are of a second data type that is different than the first data type. For example, the first data type may be float and the second data type may be integer. For example, the first data type may be integer and the second data type may be float. In some implementations, the first data type is Boolean and registers of the first set of physical registers are a single bit size. For example, the first execution resource circuit 122 may be configured to execute branch instructions. Branch execution is often on the critical path in a processor and isolating Booleans into a separate cluster may reduce circuit delay for branch resolution. In some implementations, the first data type is scalar (e.g., a 64-bit scalar) and the second data type is half-width scalar (e.g., a 32-bit scalar). In some implementations, the first data type is packed-SIMD (Single Instruction, Multiple Data) and the second data type is non-packed-SIMD. Providing a separate cluster may reduce critical path for non-packed-SIMD values. For example, a packed-SIMD cluster may be tailored for energy conservation with longer circuit delay. For example, the execution resource circuit 132 may include an arithmetic logic unit (ALU). For example, the execution resource circuit 132 may include a floating point unit (FPU). The cluster may include datapaths that enable the execution resource circuit 132 to access the registers of the first set of physical registers 134, 136, and 138 as a source register holding an input argument and/or as a destination register to store a result. For example, the second cluster 130 may be used to execute an instruction (e.g., a multiplication instruction) taking a value stored in the physical register 136 and a value stored in the physical register 138 as input arguments and output a result to the physical register 134. For example, the second set of physical registers 134, 136, and 138 may be in close proximity to the second execution resource circuit 132.

The integrated circuit 110 includes a register renaming circuit 140. The register renaming circuit 140 maintains a rename table 150 that stores data that associates a logical register of an instruction set (e.g., a RISC-V register) with one or more respective physical registers where a value of the logical register is or will be stored. The register renaming circuit 140 includes a data type predictor circuit 160 that is configured to generate data type predictions for results of an instruction that will be stored in a destination register.

The register renaming circuit 140 is configured to determine a data type prediction for a result of a first instruction that will be stored in a first logical register. The first logical register may be allowed to store data of different data types (e.g., integer or float) under an applicable instruction set. For example, the data type predictor circuit 160 may be used to determine the data type prediction. For example, the first logical register may be a vector with at least two elements and the physical register of the first set of physical registers stores the vector. For example, the first logical register may be a matrix with multiple rows and multiple columns of elements and the physical register of the first set of physical registers may store the matrix. In some implementations, the data type prediction is determined based on an opcode of the first instruction. For example, where the first instruction is a floating point add, the data type prediction may be biased toward being a float. Although, other factors may be considered to predict reinterpretation or type casting of the result by later instructions that depend on the result. In some implementations, the first instruction is an untyped transfer instruction (e.g., a load instruction), thus the opcode of the first instruction may lack information about the data type of the result.

For example, the register renaming circuit 140 may look ahead in the instruction buffer 170 to detect a second instruction that will access the result of the first instruction in the first logical register and use information about this consuming instruction to determine the data type prediction. For example, the data type prediction may be determined based on an opcode of a queued instruction that will access the result of the first instruction. The queued instruction may be stored in the instruction buffer 170. For example, the first instruction may be stored as a next instruction 172 for issue in the instruction buffer, and the register renaming circuit 140 may scan the instruction buffer to detect a second instruction 174 that will next accesses the first logical register as source register. The data type prediction may then be determined based on the opcode of the second instruction 174.

For example, the data type prediction may be determined based on a current data type of data currently stored in the first logical register. The observation is that in many codes, especially loops, the same architecture registers are used to hold the same types repeatedly. Software can improve the performance of this scheme if software developers are made aware of this prediction policy. For example, the first instruction may be a load instruction, which may provide no inherent information about the data type of its result (i.e., the value retrieved from a memory system), but a consistent use of an architectural register by software may provide the needed hints to accurately predict the data type of the data loaded from memory.

For example, the data type prediction may be determined based on a value of a program counter (e.g., the program counter value associated with the first instruction). In some implementations, the data type predictor circuit 160 may maintain a prediction table of prediction counters that is indexed by program counter value.

For example, the data type prediction may be determined based on based on combinations of the factors described above.

The register renaming circuit 140 is configured to, based on the data type prediction matching the first data type, rename the first logical register to be mapped to a physical register of the first set of physical registers 124, 126, or 128. For example, renaming the first logical register may include updating an entry of the rename table 150 to associate the first logical register to be with the physical register of the first set of physical registers 124, 126, or 128. Renaming the first logical register may cause the result of the first instruction to be mapped to the physical register of the first set of physical registers 124, 126, or 128. If the data type prediction is accurate, then when a second, later instruction accesses the first logical register to access the result, the second instruction can be executed efficiently using the first cluster 120.

If the data type prediction turns out not to be accurate, then a misprediction has occurred. For example, a misprediction may be addressed by inserting an additional micro-op before the second instruction to move the result of the first instruction to a physical register in a proper cluster for the second instruction. In some implementations, the register renaming circuit 140 is configured to detect a misprediction, where a second instruction, to be executed after the first instruction, will access the first logical register as an input of the second data type; and, responsive to the misprediction, issue a micro-op before the second instruction. The micro-op copies a value of the first logical register stored in a physical register of the first set of physical registers to a physical register of the second set of physical registers. For example, the micro-op may be a microarchitectural move instruction. In some implementations, the micro-op may also cause an update of a rename table 150 to reflect the move of the result of the first instruction.

The integrated circuit includes an instruction buffer 170. For example, the instruction buffer 170 may be a decode buffer of the integrated circuit 110. For example, the instruction buffer 170 may be an issue buffer of the integrated circuit 110. For example, the instruction buffer 170 may be a cache line of an instruction cache of the integrated circuit 110.

Figure 2:
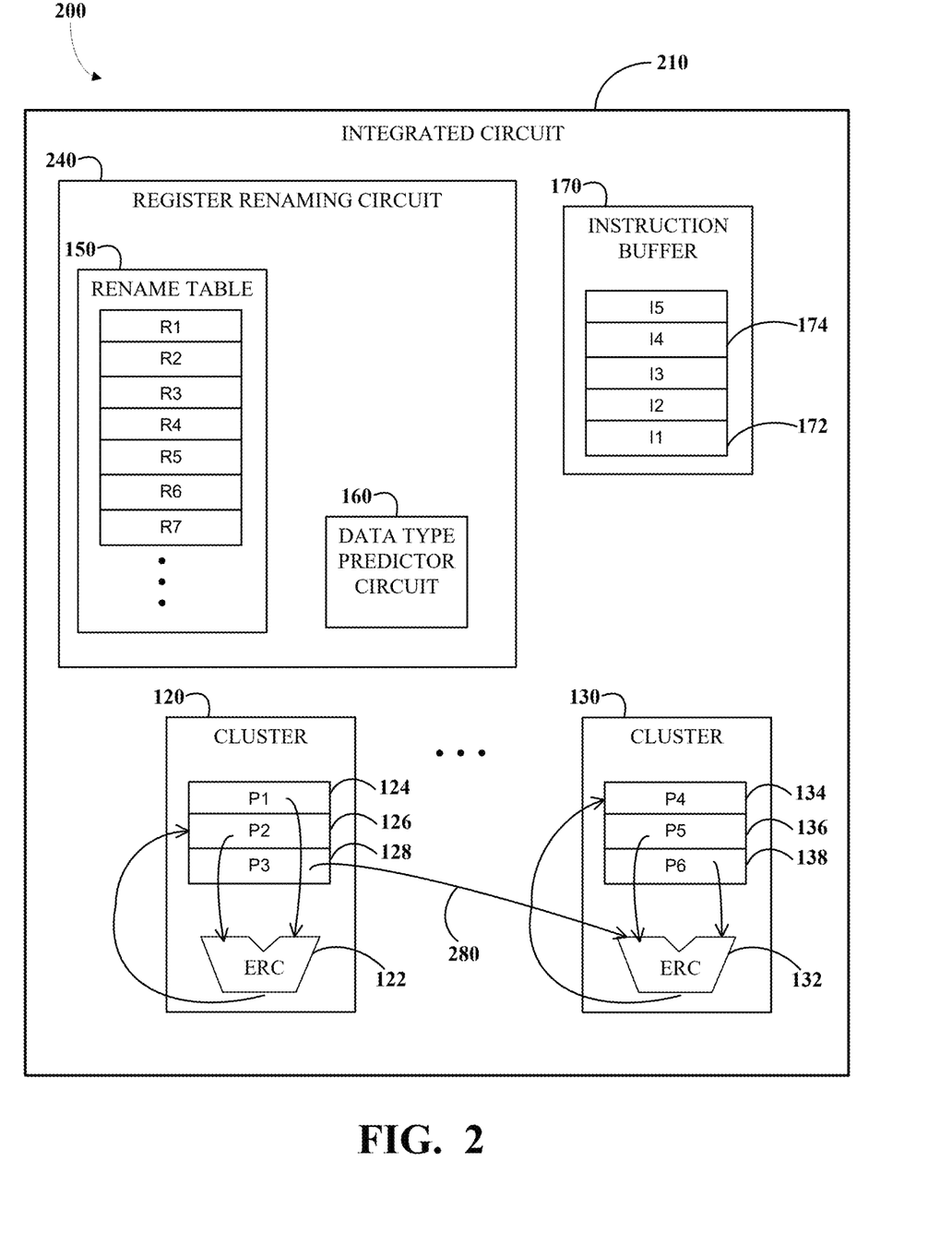
FIG. 2 is block diagram of an example of a system for executing instructions with register renaming based data type prediction and an alternate datapath between clusters that can be used to recover from a misprediction.

FIG. 2 is block diagram of an example of a system 200 for executing instructions with register renaming based data type prediction and an alternate datapath between clusters that can be used to recover from a misprediction. The system 200 includes an integrated circuit 210 for executing instructions (e.g., RISC-V instructions or x86 instructions). The integrated circuit 210 includes: the first cluster 120 configured to performs operations on one or more inputs of a first data type; the second cluster 130 configured to performs operations on one or more inputs of a second data type; and a register renaming circuit 240 configured to rename logical registers to map to physical registers in a cluster chosen from amongst a set of clusters based on a data type prediction for a result of an instruction (e.g., a load instruction, an add instruction, or an xor instruction). The integrated circuit 210 may include additional clusters (not shown inf FIG. 2) that execute instructions taking inputs of additional different data types. In some implementations, the integrated circuit 210 may include additional clusters (not shown inf FIG. 2) that execute instructions taking inputs of the first data type or the second data type and register renaming may be based on additional considerations, such as true dependency among a sequence of instructions, when selecting among multiple clusters using a same data type for register renaming. The integrated circuit 210 includes the instruction buffer 170 that stores instructions that are expected to be executed in the near future. For example, integrated circuit 210 may be microprocessor or a microcontroller.

A difference between the integrated circuit 210 and the integrated circuit 110 of FIG. 1 is that the integrated circuit 210 includes an alternate datapath 280 from a physical register 128 of the first set of physical registers 124, 126, and 128 to the second execution resource circuit 132. The alternate datapath 280 enables the second execution resource circuit 132 to directly access a value stored in the physical register 128, rather than having to wait for other resources of the integrated circuit 210 to move a result stored in the physical register 128 to a physical register of the second set of physical registers 134, 136, and 138. For example, the register renaming circuit 240 may be configured to: detect a misprediction where a second instruction, to be executed after the first instruction, will access the first logical register as an input of the second data type; and, responsive to the misprediction, cause the second execution resource circuit 132 to access a value of the first logical register using the alternate datapath 280. Using the alternate datapath 280 may consume more power to access the data from a greater distance, but may save time relative to inserting a micro-op to copy the data between clusters.

Figure 3:
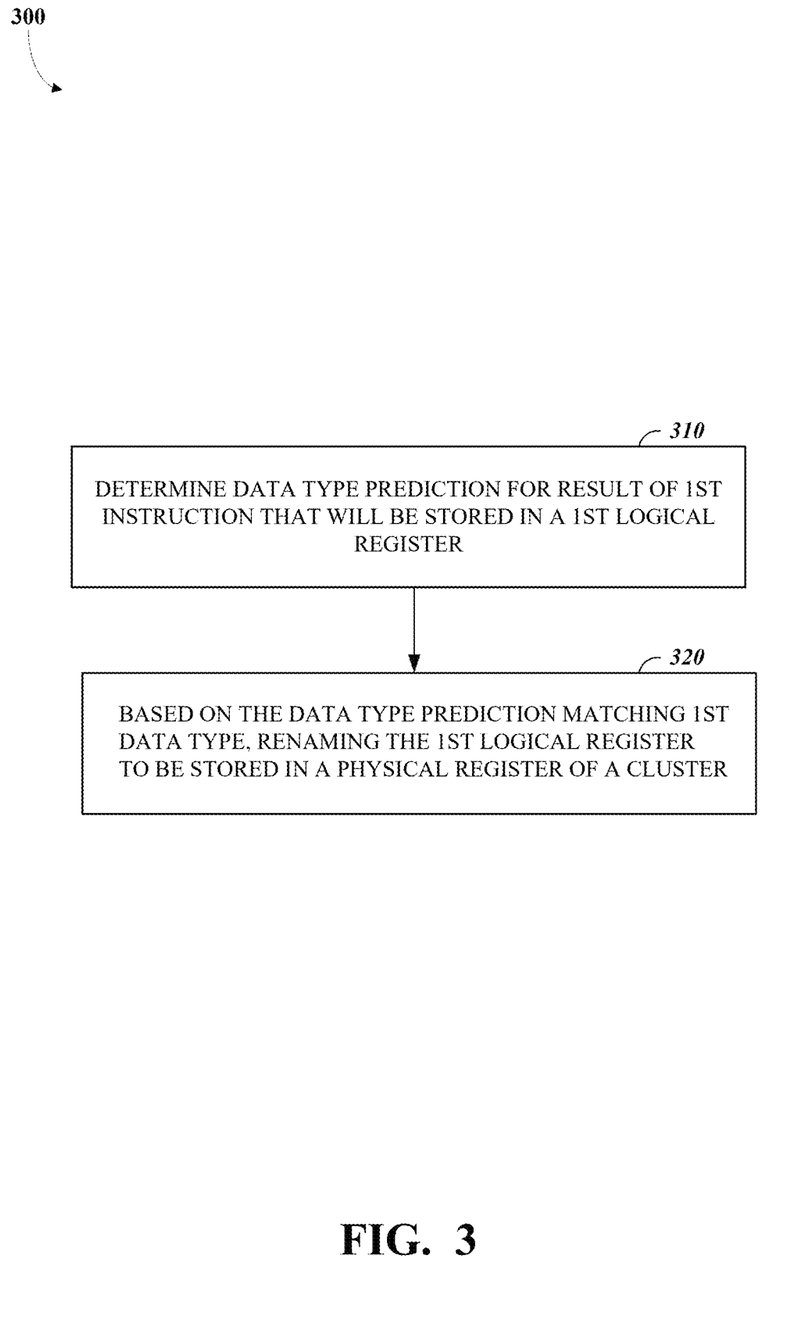
FIG. 3 is flow chart of an example of a process for register renaming based on data type prediction.

FIG. 3 is flow chart of an example of a process 300 for register renaming based on data type prediction. The process 300 includes determining 310 a data type prediction for a result of a first instruction that will be stored in a first logical register; and, based on the data type prediction matching a first data type, renaming 320 the first logical register to be mapped to a physical register of a first cluster chosen from among a plurality of clusters. For example, the process 300 may be implemented using the integrated circuit 110 of FIG. 1. For example, the process 300 may be implemented using the integrated circuit 210 of FIG. 2.

The process 300 includes determining 310 a data type prediction for a result of a first instruction that will be stored in a first logical register. The first logical register may be allowed to store data of different data types (e.g., integer, float, Boolean, scalar, vector, or matrix) under an applicable instruction set (e.g., a RISC-V instruction set or an x86 instruction set).

In some implementations, the data type prediction is determined 310 based on an opcode of the first instruction. For example, a destination register for a logical AND instruction may be predicted to be of a Boolean data type based on the opcode of the instruction that is producing the result to be stored in the destination register. For example, where the first instruction is a floating point add, the data type prediction may be biased toward being a float. However, other factors may be considered to predict reinterpretation or type casting of the result by later instructions that depend on the result.

For example, the first instruction may be an untyped transfer instruction (e.g., a load instruction). In this case opcode of the first instruction may lack information about how the result will be used, so other techniques may be used to determine 310 a data type prediction for a result of a first instruction.

For example, a look ahead in an instruction buffer may serve to identify a future instruction that is likely to access the result in the first logical register, and thus provide useful information about what data type the result should be given. In some implementations, the data type prediction is determined 310 based on an opcode of a queued instruction that will access the result of the first instruction. The queued instruction may be stored in an instruction buffer. For example, the instruction buffer may be a decode buffer. For example, the instruction buffer may be a cache line of an instruction cache. For example, the instruction buffer may be an issue buffer.

For example, the data type prediction may be determined 310 based on a current data type of data currently stored in the first logical register. The observation is that in many code segments, especially loops, the same architecture registers are used to hold the same types repeatedly. Software can improve the performance of this scheme if software developers are made aware of this prediction policy. For example, the first instruction may be a load instruction, which may provide no inherent information about the data type of its result (i.e., the value retrieved from a memory system), but a consistent use of an architectural register by software may provide the needed hints to determine 310 an accurate data type prediction for the data loaded from memory.

For example, the data type prediction may be determined 310 based on a value of a program counter (e.g., the program counter value associated with the first instruction). In some implementations, a prediction table of prediction counters that are indexed by program counter value may be maintained. In some implementations, the data type prediction may be determined 310 randomly.

For example, the data type prediction may be determined 310 based on based on combinations of the factors described above, such as opcode of the first instruction, look ahead for an opcode of a later consuming instruction, a current data type of the first logical register, and/or a program counter value.

The process 300 includes, based on the data type prediction matching a first data type, renaming 320 the first logical register to be mapped to a physical register of a first cluster chosen from among a plurality of clusters. The first cluster may include a first set of physical registers and a first execution resource circuit configured to perform operations that take contents of one or more registers of the first set of physical registers as input. The inputs for operations of the first execution resource circuit may be of the first data type. The plurality of clusters may include a second cluster including a second set of physical registers and a second execution resource circuit configured to perform operations that take contents of one or more registers of the second set of physical registers as input. The inputs for operations of the second execution resource circuit may be of a second data type that is different than the first data type. For example, the first data type may be float and the second data type may be integer. For example, the first data type may be integer and the second data type may be float. In some implementations, the first data type is Boolean and registers of the first set of physical registers are a single bit size. For example, the first execution resource circuit may be configured to execute branch instructions. In some implementations, the first logical register is a vector with at least two elements and the physical register of the first set of physical registers stores the vector. In some implementations, the first logical register is a matrix with multiple rows and multiple columns of elements and the physical register of the first set of physical registers stores the matrix. In some implementations, the first data type is scalar (e.g., a 64-bit scalar) and the second data type is half-width scalar (e.g., a 32-bit scalar). In some implementations, the first data type is packed-SIMD (Single Instruction, Multiple Data) and the second data type is non-packed-SIMD. Providing a separate cluster may reduce critical path for non-packed-SIMD values.

If the data type prediction turns out to be inaccurate, then a misprediction has occurred. In some implementations, a misprediction may be addressed by inserting an additional micro-op before the second instruction to move the result of the first instruction to a physical register in a proper cluster for the second instruction. For example, the process 400 of FIG. 4 may be implemented to handle mispredictions of the data type of a result. In some implementations, a misprediction may be addressed by using an alternate datapath in the integrated circuit to access the result from one cluster in a different cluster associated with a different data type. For example, the process 500 of FIG. 5 may be implemented to handle mispredictions of the data type of a result.

Figure 4:
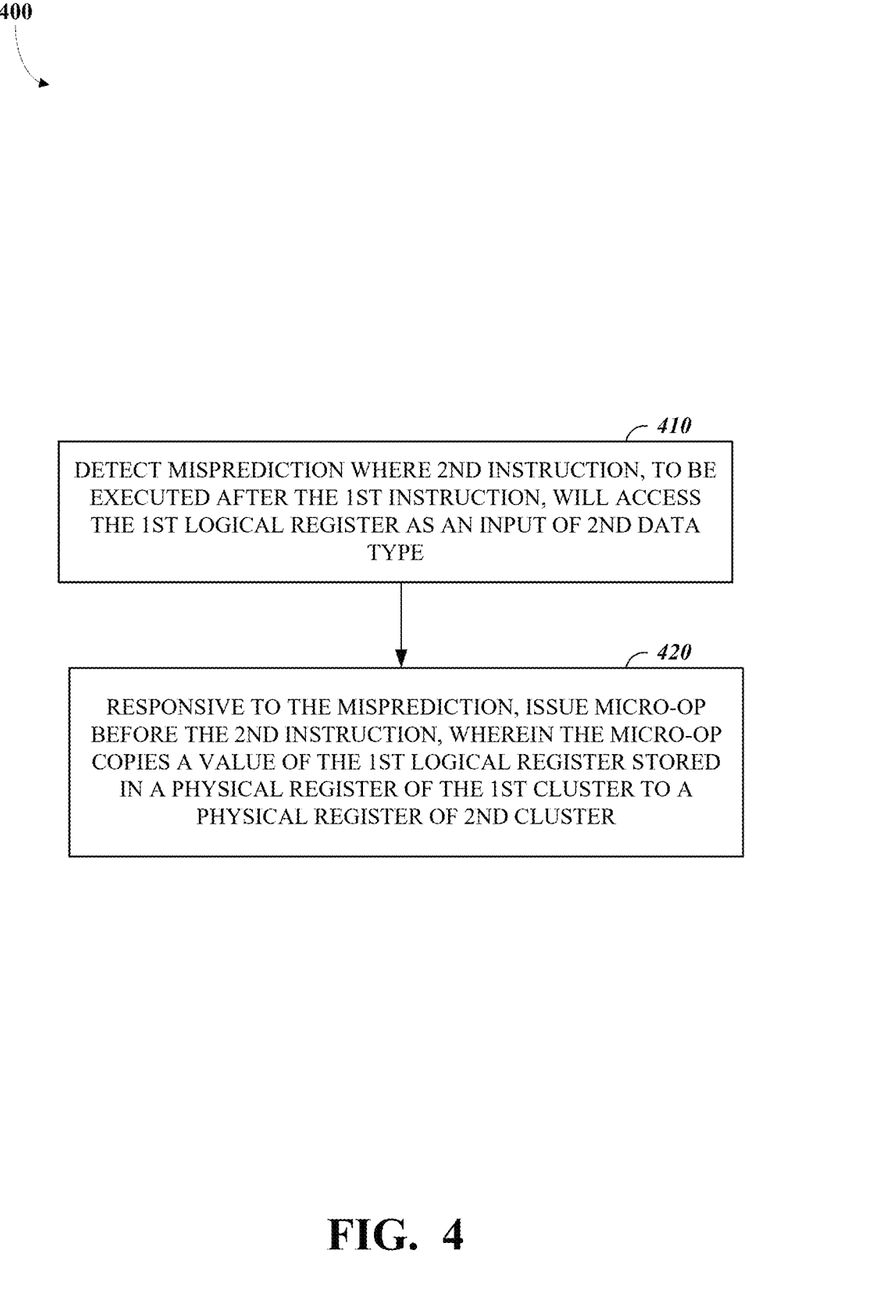
FIG. 4 is flow chart of an example of a process for recovering from a data type misprediction by inserting a micro-operation (micro-op) to move data to a correct cluster.

FIG. 4 is flow chart of an example of a process 400 for recovering from a data type misprediction by inserting a micro-op to move data to a correct cluster. The process 400 includes detecting 410 a misprediction where a second instruction, to be executed after the first instruction, will access the first logical register as an input of the second data type; and, responsive to the misprediction, issuing 420 a micro-op before the second instruction, to copy a value of the first logical register stored in a physical register of a cluster to a physical register of a second cluster. For example, the process 400 may be implemented using the integrated circuit 110 of FIG. 1. For example, the process 400 may be implemented using the integrated circuit 210 of FIG. 2.

The process 400 includes detecting 410 a misprediction where a second instruction, to be executed after the first instruction, will access the first logical register as an input of the second data type. For example, a misprediction may be detected 410 when the second instruction is sitting in an issue buffer by scanning the issue buffer for instructions with the first logical register as a source register. Detecting 410 a misprediction may also include checking for intervening overwrites of the result of the first instruction in the logical register. Detecting 410 a misprediction may include, when a second instruction is found that accesses the result in the first logical register, checking whether the data type of the first logical register as source register for the second instruction matches the data type prediction for the result of the first instruction and/or whether the result is currently stored in a proper cluster for executing the second instruction.

The process 400 includes, responsive to the misprediction, issuing 420 a micro-op before the second instruction. The micro-op copies a value of the first logical register stored in a physical register of the first set of physical registers (i.e., of the first cluster) to a physical register of the second set of physical registers (i.e., of the second cluster). For example, the micro-op may be a microarchitectural move instruction. In some implementations, the micro-op may also cause an update of a rename table (e.g., the rename table 150) to reflect the move of the result of the first instruction. After the result of the first instruction has been copied to the second cluster, the second cluster may be used to execute the second instruction, efficiently accessing the result of the first instruction and treating it as data of the second data type associated with the second cluster.

Figure 5:
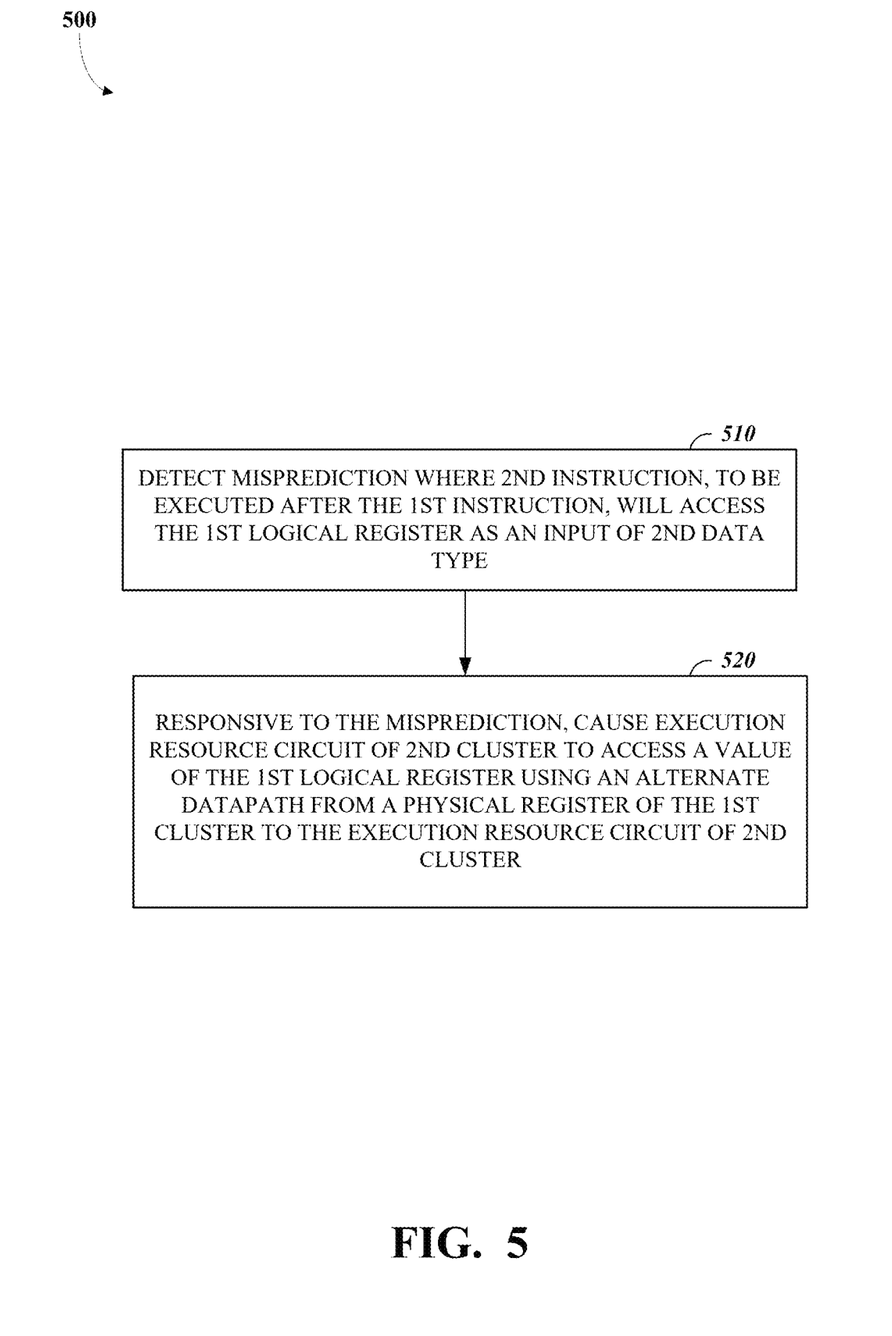
FIG. 5 is flow chart of an example of a process for recovering from a data type misprediction by using an alternate datapath between clusters.

FIG. 5 is flow chart of an example of a process 500 for recovering from a data type misprediction by using an alternate datapath between clusters. The process 500 includes detecting 510 a misprediction where a second instruction, to be executed after the first instruction, will access the first logical register as an input of the second data type; and, responsive to the misprediction, causing 520 a second execution resource circuit (e.g., the second execution resource circuit 132) to access a value of the first logical register using an alternate datapath (e.g., the alternate datapath 280) from a physical register of the first set of physical registers (e.g., of the first cluster 120) to the second execution resource circuit. For example, the process 500 may be implemented using the integrated circuit 210 of FIG. 2.

The process 500 includes detecting 510 a misprediction where a second instruction, to be executed after the first instruction, will access the first logical register as an input of the second data type. For example, a misprediction may be detected 510 when the second instruction is sitting in an issue buffer by scanning the issue buffer for instructions with the first logical register as a source register. Detecting 510 a misprediction may also include checking for intervening overwrites of the result of the first instruction in the logical register. Detecting 510 a misprediction may include, when a second instruction is found that accesses the result in the first logical register, checking whether the data type of the first logical register as source register for the second instruction matches the data type prediction for the result of the first instruction and/or whether the result is currently stored in a proper cluster for executing the second instruction.

The process 500 includes, responsive to the misprediction, causing 520 the second execution resource circuit to access a value of the first logical register using an alternate datapath from a physical register of the first set of physical registers (i.e., of the first cluster) to the second execution resource circuit. An integrated circuit (e.g., the integrated circuit 210) includes an alternate datapath from a physical register of the first set of physical registers to the second execution resource circuit. The alternate datapath enables the second execution resource circuit to directly access a value stored in the physical register of the first set of physical registers, rather than having to wait for other resources of the integrated circuit to move a result stored in the physical register to a physical register of the second set of physical registers. Using the alternate datapath may consume more power to access the data from a greater distance, but may save time relative to inserting a micro-op to copy the data between clusters.

Figure 6:
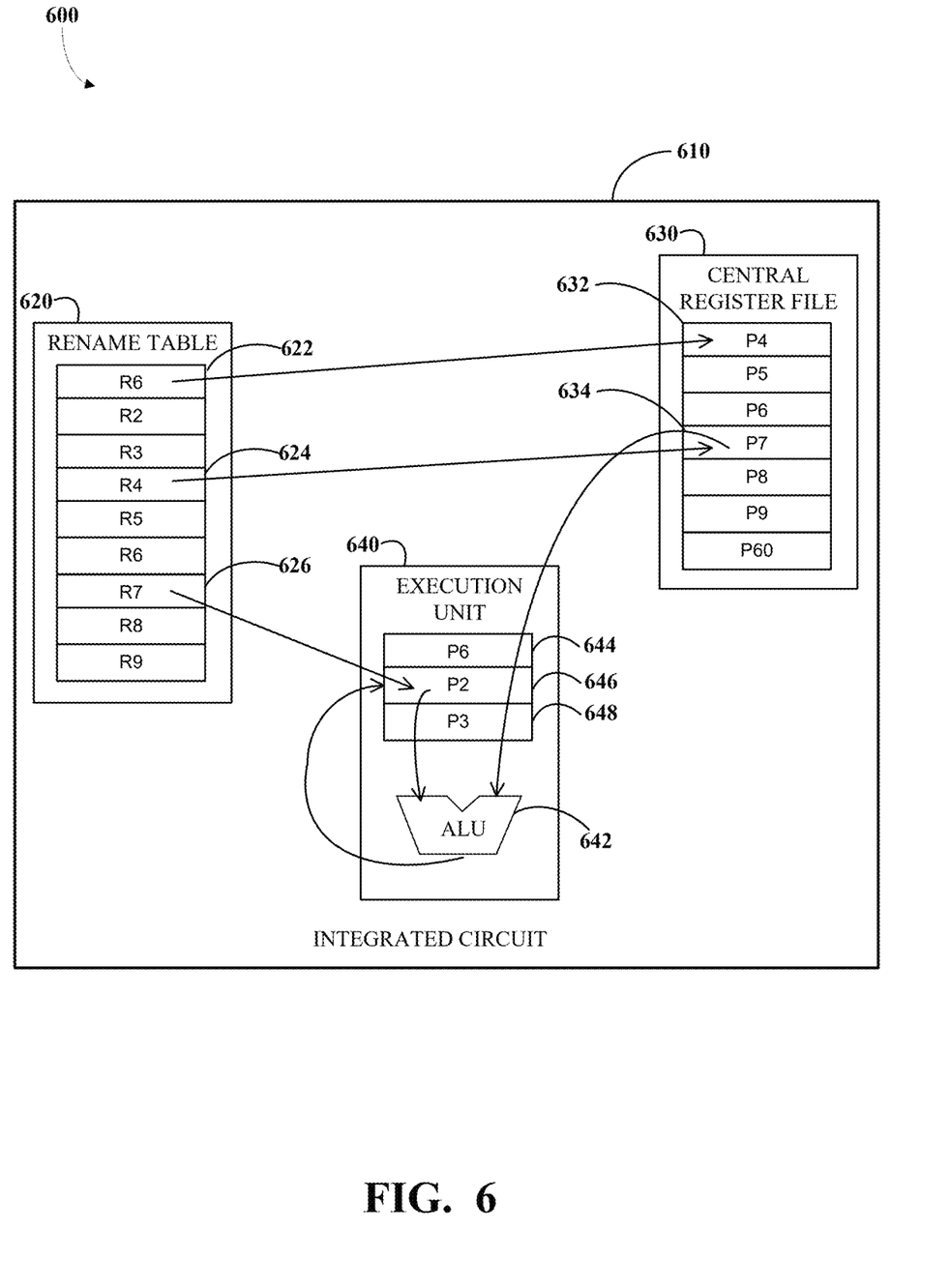
FIG. 6 is block diagram of an example of a system for executing instructions from an instruction set with register renaming.

FIG. 6 is block diagram of an example of a system 600 for executing instructions from an instruction set with register renaming. The system 600 includes an integrated circuit 610 configured to execute the instructions. For example, the integrated circuit 610 may be a processor or a microcontroller. The integrated circuit 610 includes a renaming table 620, a central register file 630, and an execution resource unit 640. The renaming table 620 includes entries (e.g., entry 622, 624, and 626) that map logical registers supported by an assembly instruction set (e.g., a RISC V instruction set, an x86 instruction set, or an ARM instruction set) to physical registers of the integrated circuit 610. The central register file 630 includes physical registers, such as the physical register 632 and the physical register 634. The execution resource unit 640 includes an execution resource circuit 642 and physical registers 644, 646, and 648 in close proximity to execution resource circuit 642.

A feature of the integrated circuit 610 is that it includes a renaming table 620 mapping to physical registers in different locations on the integrated circuit 610. In some implementations, the physical registers may be of different types. For example, physical registers 644, 646, and 648 may be vectors while in the physical register 632 may store a scalar. The physical registers 644, 646, and 648 are in close proximity to the arithmetic logical unit (ALU) 642, which may result in higher speed, power savings, and/or smaller area.

In some implementations, the renaming table 620 may enable the use of a heterogeneous set of physical registers in proximity to execution resource circuits. For example, an instruction set architecture (ISA) may encode the shape (e.g., scalar, vector, or matrix) of a logical register. In some implementations, each logical register name of the ISA may encode the shape of the logical register. During fetch, decode, execute, the shape of the operands (e.g., sources and the destination) may be known. This may enable the use of different types (e.g., scalar, vector, and matrix) of registers for different parts of an equation implemented with instructions of the ISA. In some implementations, two types of vectors, one for row vectors another for column vectors, may be supported to better handle two-dimensional matrix operations. See FIG. 7 for an example of potential physical register types near a matrix functional unit.

Figure 7:
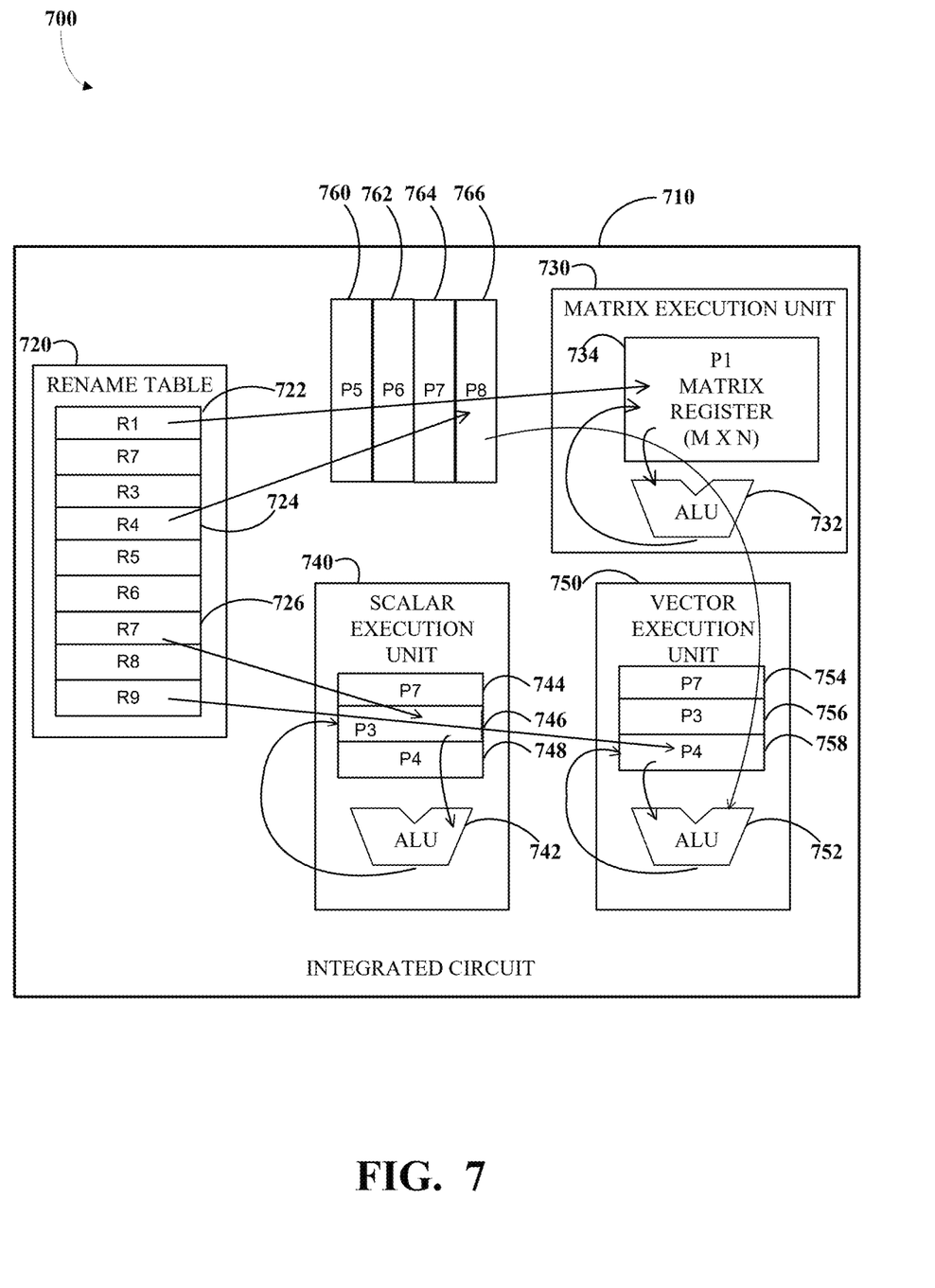
FIG. 7 is block diagram of an example of a system for executing instructions from an instruction set with register renaming.

FIG. 7 is block diagram of an example of a system 700 for executing instructions from an instruction set with register renaming. The system 700 includes an integrated circuit 710 configured to execute the instructions. For example, the integrated circuit 710 may be a processor or a microcontroller. The integrated circuit 710 includes a renaming table 720, a metric, a matrix execution unit 730, a scalar execution unit 740, a vector execution unit 750, and physical registers 760, 762, 764, and 766. The renaming table 720 includes entries (e.g., 722, 724, and 726) that map logical registers supported by an assembly instruction set (e.g., a RISC V instruction set, an x86 instruction set, or an ARM instruction set) to physical registers of the integrated circuit 710. The matrix execution unit 730 includes an execution resource circuit 732 and a physical register 734 that stores a matrix in close proximity to execution resource circuit 732. The scalar execution unit 740 includes an execution resource circuit 742 and physical registers 744, 746, and 748 that store scalars in close proximity to execution resource circuit 742. The vector execution unit 750 includes an execution resource circuit 752 and physical registers 754, 756, and 758 that store vectors in close proximity to execution resource circuit 752.

The integrated circuit 710 includes four types of physical registers. Note that some of the physical registers (760, 762, 764, and 766) for one-dimensional vectors do not have functional units because those feed the matrix functional units. For example, the physical registers 760, 762, 764, and 766 may store column vectors. In contrast, the, scalar, and matrix, has functional units in proximity for operations. In some implementations (not shown in FIG. 7), the integrated circuit 710 could include one or more execution resource circuits proximal to the physical registers 760, 762, 764, and 766 for one-dimensional vectors (e.g., column vectors). The example architecture of FIG. 7 may be more efficient for an ISA in which vectors are designated as subject to matrix transformations or elementwise operations. Although not shown in FIG. 7, there could be multiple physical matrix registers.

For example, a simple path is: input all type1, Output all type1→allocate type1 registers (e.g., all scalar, or all one-dimensional vector (e.g., row vectors), or load matrix). If there are no physical registers available, then an instruction may be delayed to schedule execution when an appropriate physical register is available.

For example, a slightly more complex path is: picking best type of physical register for each input/output according to the ISA or the hints in the register names.

For example, an advanced path/more complex embodiment is: apply branch prediction-type heuristics to track how results are used and pick the right type of register for the outputs. For example, in FIG. 7 we may have two types of one-dimensional vectors, row and column. Inefficiencies may arise if results are often stored in row vectors, but the results are needed for use in column vectors for a later matrix operations. And vice versa, inefficiencies may arise if results are often stored in column vector registers, but the results are needed for performing operations directly that needs a move. Thus on this path, tracking the most recent use of that operand can inform future placement. Most loops would support this with a simple predictor consisting of a buffer that tracks what type of register was used in the previous occurrence. So you would track something like this for the renaming table:

| Rename Table | Usage prediction |
|---|---|
| v0 | 1D row vector |
| v1 | scalar |
| v2 | 2D matrix |
| v3 | 1D column vector |
| v . . . | |

Where usage prediction is just what happened last to that case previously. Thus, the predictions produced by the predictor may be dependent on the last path.

Another issue beyond physical geography, is what happens if you have integer ALUs and another ALU that does floating point calculations. Thus, the types of physical registers available may also vary by the precision format of the one or elements of the register. For example, the renaming table may be extended to track or predict element type for a logical register, which may result in the renaming table:

| Rename Table | Usage prediction | Element Type |
|---|---|---|
| v0 | 1D row vector | Single prec. Floating point |
| v1 | scalar | Double prec. Floating point |
| v2 | 2D matrix | Integer |
| v3 | 1D column vector | Custom |
| v . . . | | |

Register renaming may be associated with out-of-order execution in processors. This approach may be used with both.

For example, an integrated circuit 610 for executing instructions includes an execution resource circuit 642 configured to execute instructions on operands stored in physical registers, a set of physical registers including a first subset of physical registers 644, 646, and 648 located in proximity to the execution resource circuit and a second subset of physical registers (e.g., the central register file 630) that are located further from the execution resource circuit 642 than the registers in the first subset of physical registers 644, 646, and 648, and a register renaming circuit configured to: detect a sequence of instructions stored in an instruction decode buffer, the sequence of instructions including multiple sequential references to a first logical register with true dependency; and, based on detection of the sequence of instructions, rename the first logical register to be mapped to a physical register of the first subset of physical registers 644, 646, and 648 and rename another logical register referenced in the sequence of instructions to be mapped to a physical register of the second subset of physical registers 644, 646, and 648. For example, the first logical register may be a vector with at least two elements and the physical register of the first subset of physical registers stores the vector. For example, the first logical register may be a matrix with multiple rows and multiple columns of elements and the physical register of the first subset of physical registers stores the matrix. In some implementations, the sequence of instructions accumulates a sum in the first logical register.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An integrated circuit for executing instructions comprising:
    a first cluster including a first set of physical registers and a first execution resource circuit configured to perform operations that take contents of one or more registers of the first set of physical registers as first inputs, wherein the first inputs for operations of the first execution resource circuit are of a first data type;
    a second cluster including a second set of physical registers and a second execution resource circuit configured to perform operations that take contents of one or more registers of the second set of physical registers as second inputs, wherein the second inputs for operations of the second execution resource circuit are of a second data type that is different than the first data type; and
    a register renaming circuit configured to:
        determine a data type prediction for a result of a first instruction that will be mapped to a first logical register;
        based on the data type prediction matching the first data type, rename the first logical register to be mapped to a first physical register of the first set of physical registers;
        detect a misprediction where a second instruction, to be executed after the first instruction, will access the first logical register as an input of the second data type; and
        responsive to the misprediction, issue a micro-operation (micro-op) before the second instruction, wherein the micro-op copies a value of the first logical register mapped to the first physical register to a second physical register of the second set of physical registers.

2. The integrated circuit of claim 1, in which the first instruction is an untyped transfer instruction.

3. The integrated circuit of claim 1, in which the first instruction is a load instruction.

4. The integrated circuit of claim 1, in which the data type prediction is determined based on an opcode of the first instruction.

5. The integrated circuit of claim 1, in which the data type prediction is determined based on an opcode of a queued instruction that will access the result of the first instruction, wherein the queued instruction is stored in an instruction buffer.

6. The integrated circuit of claim 1, in which the data type prediction is determined based on a current data type of data currently mapped to the first logical register.

7. A method for executing instructions comprising:
   determining a data type prediction for a result of a first instruction that will be mapped to a first logical register;
   based on the data type prediction matching a first data type, renaming the first logical register to be mapped to a physical register of a first cluster chosen from among a plurality of clusters, wherein the plurality of clusters includes:
      the first cluster, which includes a first set of physical registers and a first execution resource circuit configured to perform operations that take contents of one or more registers of the first set of physical registers as first inputs, wherein the first inputs for operations of the first execution resource circuit are of the first data type; and
      a second cluster, which includes a second set of physical registers and a second execution resource circuit configured to perform operations that take contents of one or more registers of the second set of physical registers as second inputs, wherein the second inputs for operations of the second execution resource circuit are of a second data type that is different than the first data type;
   detecting a misprediction where a second instruction, to be executed after the first instruction, will access the first logical register as an input of the second data type; and
   responsive to the misprediction, issuing a micro-operation (micro-op) before the second instruction, wherein the micro-op copies a value of the first logical register mapped to a first physical register of the first set of physical registers to a second physical register of the second set of physical registers.

8. The method of claim 7, in which the first instruction is an untyped transfer instruction.

9. The method of claim 7, in which the first instruction is a load instruction.

10. The method of claim 7, in which the data type prediction is determined based on an opcode of the first instruction.

11. The method of claim 7, in which the data type prediction is determined based on an opcode of a queued instruction that will access the result of the first instruction, wherein the queued instruction is stored in an instruction buffer.

12. The method of claim 7, in which the data type prediction is determined based on a current data type of data currently mapped to the first logical register.

* * * * *